United States Patent
Hewinson (10) Patent No.: US 8,520,807 B1
(45) Date of Patent: Aug. 27, 2013

(54) PHONETICALLY UNIQUE COMMUNICATION IDENTIFIERS

(75) Inventor: Philip Hewinson, London (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/572,369

(22) Filed: Aug. 10, 2012

(51) Int. Cl.
*H04M 1/64* (2006.01)
*G10L 21/00* (2006.01)

(52) U.S. Cl.
USPC ........................................ 379/88.01; 704/275

(58) Field of Classification Search
USPC .................... 379/88.01–88.04; 704/270–275
See application file for complete search history.

(56) References Cited

U.S. PATENT DOCUMENTS

| | | | |
|---|---|---|---|
| 5,369,685 A | 11/1994 | Kero | |
| 5,483,586 A | 1/1996 | Sussman | |
| 5,752,232 A | 5/1998 | Basore et al. | |
| 5,991,364 A | 11/1999 | McAllister et al. | |
| 6,044,399 A | 3/2000 | Elledge | |
| 6,463,533 B1 | 10/2002 | Calamera et al. | |
| 6,650,735 B2 * | 11/2003 | Burton et al. | 379/88.01 |
| 6,768,792 B2 | 7/2004 | Brown et al. | |
| 6,999,930 B1 | 2/2006 | Roberts et al. | |
| 7,120,927 B1 | 10/2006 | Beyda et al. | |
| 7,487,089 B2 | 2/2009 | Mozer | |
| 7,526,073 B2 | 4/2009 | Romeo | |
| 7,536,304 B2 | 5/2009 | Di Mambro et al. | |
| 7,571,100 B2 | 8/2009 | Lenir et al. | |
| 7,747,446 B2 | 6/2010 | Blass et al. | |
| 7,890,957 B2 | 2/2011 | Campbell | |
| 7,966,171 B2 | 6/2011 | Gilbert et al. | |
| 7,970,384 B1 | 6/2011 | Lambert et al. | |
| 8,095,672 B1 | 1/2012 | Newstadt et al. | |
| 8,140,340 B2 | 3/2012 | Bhogal et al. | |
| 8,185,646 B2 | 5/2012 | Headley | |
| 8,218,744 B2 | 7/2012 | Belz et al. | |
| 8,219,404 B2 | 7/2012 | Weinberg et al. | |
| 8,225,103 B2 | 7/2012 | Chiou et al. | |
| 8,302,152 B1 | 10/2012 | Hewinson | |
| 8,358,759 B2 | 1/2013 | Kumar | |
| 2002/0147914 A1 | 10/2002 | Arnold | |
| 2002/0152272 A1 | 10/2002 | Yairi | |
| 2005/0164651 A1 * | 7/2005 | Ollis et al. | 455/100 |
| 2005/0232470 A1 | 10/2005 | Chaudhari et al. | |
| 2006/0035632 A1 | 2/2006 | Sorvari et al. | |
| 2006/0235684 A1 | 10/2006 | Chang | |
| 2006/0277043 A1 | 12/2006 | Tomes et al. | |
| 2006/0293891 A1 | 12/2006 | Pathuel | |

(Continued)

OTHER PUBLICATIONS

Benyon et al., "Adaptive Systems: from intelligent tutoring to autonomous agents", 52 pages.

(Continued)

*Primary Examiner* — Samuel G Neway
(74) *Attorney, Agent, or Firm* — Fish & Richardson P.C.

(57) ABSTRACT

Systems, methods performed by data processing apparatus and computer storage media encoded with computer programs for receiving from a user information including a phonetic communication identifier that other users can speak into their respective communication devices to initiate communication with a communication device associated with the user, comparing the received phonetic communication identifier with a repository of phonetically unique communication identifiers each registered to an associated entity, registering the received phonetic communication identifier in the repository if, based on a result of the comparison, the received phonetic communication identifier is determined to be phonetically unique relative to all other phonetically unique communication identifiers in the repository, and making the repository available to initiate communications with registered entities.

27 Claims, 5 Drawing Sheets

(56) References Cited

U.S. PATENT DOCUMENTS

| | | |
|---|---|---|
| 2007/0060114 A1 | 3/2007 | Ramer et al. |
| 2007/0066288 A1* | 3/2007 | Soelberg et al. .............. 455/415 |
| 2007/0100929 A1* | 5/2007 | DeRobertis et al. .......... 709/200 |
| 2007/0169202 A1 | 7/2007 | Goldberg et al. |
| 2008/0037720 A1 | 2/2008 | Thomson et al. |
| 2008/0082332 A1 | 4/2008 | Mallett et al. |
| 2010/0030738 A1 | 2/2010 | Geer |
| 2010/0088753 A1 | 4/2010 | Ayres et al. |
| 2010/0161338 A1 | 6/2010 | Tofighbakhsh |
| 2010/0316198 A1 | 12/2010 | Balasaygun et al. |
| 2011/0022388 A1 | 1/2011 | Wu et al. |
| 2011/0047076 A1 | 2/2011 | Carlson et al. |
| 2011/0047245 A1 | 2/2011 | Abramson et al. |
| 2011/0082874 A1 | 4/2011 | Gainsboro et al. |
| 2011/0177829 A1 | 7/2011 | Platt et al. |
| 2011/0194682 A1 | 8/2011 | Hans et al. |
| 2011/0221671 A1 | 9/2011 | King, III et al. |
| 2011/0231310 A1 | 9/2011 | Roberts et al. |
| 2011/0258686 A1 | 10/2011 | Raj et al. |
| 2011/0288866 A1 | 11/2011 | Rasmussen |
| 2011/0302128 A1 | 12/2011 | Hayashi et al. |
| 2012/0022874 A1 | 1/2012 | Lloyd et al. |
| 2012/0065973 A1 | 3/2012 | Cho et al. |
| 2012/0078638 A1 | 3/2012 | Novack et al. |
| 2012/0084078 A1 | 4/2012 | Moganti et al. |
| 2012/0134478 A1 | 5/2012 | Broman et al. |
| 2012/0173239 A1 | 7/2012 | Sanchez Asenjo et al. |
| 2012/0232900 A1 | 9/2012 | Brummer et al. |
| 2012/0239407 A1 | 9/2012 | Lynch et al. |
| 2012/0253790 A1 | 10/2012 | Heck et al. |
| 2012/0253811 A1 | 10/2012 | Breslin et al. |
| 2012/0260188 A1 | 10/2012 | Park et al. |
| 2012/0310980 A1 | 12/2012 | Hepper |
| 2013/0006634 A1 | 1/2013 | Grokop et al. |

OTHER PUBLICATIONS

Cohen et al., "An Open Agent Architecture", 8 pages.

Maes, Patti, "Agents that Reduce Work and Information Overlad", file:///C|/Misdocumentos/alberto/itesm/Sistemas/material_curso/maes94/maes94.html, Oct. 10, 2000, 17 pages.

Nardi et al., "Collaborative, Programmable Intelligent Agents", Communications of the ACM, vol. 41, No. 3, Mar. 1998, 9 pages.

Non-final Office Action, U.S. Appl. No. 13/572,364, Oct. 15, 2012, 21 pages.

Aswani et al; Mining Information for Instance Unification; ISWC 2006, LNCS 4273; 2006; pp. 329-342; Springer-Verlag Berlin Heidelberg.

Non-final Office Action, U.S. Appl. No. 13/561,621, Oct. 26, 2012, 12 pages.

Pantel, Patrick ; Alias Detection in Malicious Environments; Proceedings of AAAI fall symposium on capturing and using patterns for evidence detection; 2006; pp. 14-20; American Association for Artificial Intelligence.

Non-final Office Action, U.S. Appl. No. 13/572,208, Dec. 6, 2012, 12 pages.

Office Action issued in U.S. Appl. No. 13/561,621 on Feb. 20, 2013, 12 pages.

Notice of Allowance issued in U.S. Appl. No. 13/572,208 on Mar. 29, 2013, 18 pages.

Office Action issued in U.S. Appl. No. 13/572,364 on Apr. 11, 2013, 22 pages.

\* cited by examiner

FIG. 1

| Phonetically Unique Communication Identifier 205 | Telephone Number 210 | Email Address 215 | WebPage Address 220 | Other |
|---|---|---|---|---|
| 240 John Lee Hooker | 240 555-232-1136 | 245 johnlee@comcox.net | 250 www.johnleehooker.com | 192.168.11.34 |
| 260 RL Burnside | 265 555-872-2199 | 270 rlb@bluestown.us | 275 www.rlburnside.com | 215.34.22.1 |
| | | | | |

PHONETICALLY UNIQUE COMMUNICATION IDENTIFIERS

FIELD

This specification generally relates to phonetically unique communication identifiers, e.g., telephone numbers, email addresses or the like.

BACKGROUND

When not speaking face-to-face, people employ various forms of electronic communication (e.g., telephone calls, email messages, text messages, instant messages, social network posting, e-calendar invitations, online content sharing and the like) in order to converse or otherwise exchange information with one another. Typically, to initiate an instance of electronic communication, the originator must input or otherwise specify a communication identifier that uniquely identifies the desired communication recipient. For example, if the originator desires to place a telephone call to the recipient, the originator first must input the recipient's unique telephone number, which, in the United States, typically is composed of ten digits such as 555-123-4567. Similarly, if the originator desires to send an email message to the recipient, the originator first must input the recipient's unique email address, which typically takes the form recipient@email.net. For each recipient with whom the originator wants to initiate electronic communication on a regular basis, the originator typically will maintain a data repository (e.g., in the form of an electronic contact list) to keep track of all the recipients' various and respective unique communication identifiers (i.e., phone numbers, email addresses, etc.).

SUMMARY

In general, one aspect of the subject matter described in this specification may be embodied in systems, methods performed by data processing apparatus and computer storage media encoded with computer programs that include the actions of receiving from a user information including a phonetic communication identifier that other users can speak into their respective communication devices to initiate communication with a communication device associated with the user, comparing the received phonetic communication identifier with a repository of phonetically unique communication identifiers each registered to an associated entity, registering the received phonetic communication identifier in the repository if, based on a result of the comparison, the received phonetic communication identifier is determined to be phonetically unique relative to all other phonetically unique communication identifiers in the repository, and making the repository available to initiate communications with registered entities.

The repository may be globally available and each registered communication identifier may be globally phonetically unique. The determination of phonetic uniqueness may be speaker-independent and/or may take into account one or more of differences in speakers' race, ethnicity, accent, language, dialect, pronunciation, gender, age, and region.

The actions may further include prompting the first user to enter a different phonetic communication identifier if, based on a result of the comparison, the received phonetic communication identifier is determined not to be phonetically unique relative to one or more of the phonetically unique communication identifiers in the repository. Alternatively, or in addition, the actions may further include providing the first user with suggestions for a phonetically unique communication identifier if, based on a result of the comparison, the received phonetic communication identifier is determined not to be phonetically unique relative to one or more of the phonetically unique communication identifiers in the repository.

The information received from first user further may further include one or more of a telephone number, an email address, and a website address associated with the first user. At least two or more of the phonetically unique communication identifiers in the repository may be registered internet domain names. The repository of phonetically unique communication identifiers may be administered by one or more internet domain name registrars.

[3] In general, another aspect of the subject matter described in this specification may be embodied in systems, methods performed by data processing apparatus and computer storage media encoded with computer programs that include the actions of receiving an utterance from a user comprising a phonetic communication identifier, comparing the received utterance against a global repository of a plurality of globally phonetically unique communication identifiers, based on a result of the comparison, determining a best match between the received phonetic communication identifier and one of the globally phonetically unique communication identifiers in the repository, and initiating an instance of communication using a communication path associated with the best matched globally phonetically unique communication identifier.

Phonetic uniqueness may be speaker-independent and/or may take into account one or more or differences in speakers' race, ethnicity, accent, language, dialect, pronunciation, gender, age, and region. The received utterance may further include a command specifying a form of communication, such as a telephone call, an email message, and/or a website post. The received phonetic communication identifier may include a registered internet domain name.

The actions may further include prompting the first user to enter a different phonetic communication identifier if, based on a result of the comparison, the received phonetic communication identifier does not sufficiently match any of the phonetically unique communication identifiers in the repository.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The present inventor recognized that conventional communication identifiers (e.g., telephone numbers, email addresses) are not user-friendly in that they tend to be relatively difficult to remember. For example, if a communication originator desired to call his friend Joe, and Joe's telephone number happened to be 555-918-7364, then the communication originator would be forced to memorize, and then repeat, that sequence of ten digits whenever he wanted to call Joe. Alternatively, the communication originator could record Joe's telephone number, for example, in an electronic contact list, but even then the communication originator would have to access his contact list to translate Joe's name into Joe's telephone number in order to place a call to Joe. Accordingly, the present inventor recognized that it may be advantageous for people to have more user-friendly communication identifiers that, e.g., would still uniquely identify a communication path to that person while also being relatively easy to remember.

Such user-friendly communication identifiers could provide access not only to telephone numbers but also to email addresses, websites, text message addresses, social profiles or essentially any other communication path to the person in question. To help facilitate widespread use and adoption, the communication identifiers could have various characteristics that would make them easier to use and less likely to cause confusion and/or misdirected communications. For example, as with telephone numbers and email addresses, the communication identifiers should uniquely identify, on a global basis, a single individual or entity.

Moreover, with the increasing use of voice as the input mechanism of choice, the communication identifiers could be phonetically unique, again on a global basis, meaning that the identifiers not only are speaker independent but also take into account differences in language, pronunciation, voice, accent and other factors that could impact a determination of phonetic uniqueness. Because many words that are phonetically unique when spoken by one group of speakers are in fact homophones when spoken by another group of speakers, the global registry would limit registration, to the extent feasible and/or appropriate, only to communication identifiers that are truly phonetically unique regardless of the race, ethnicity, language, gender, age, region, etc. of the speaker.

Figure 1:
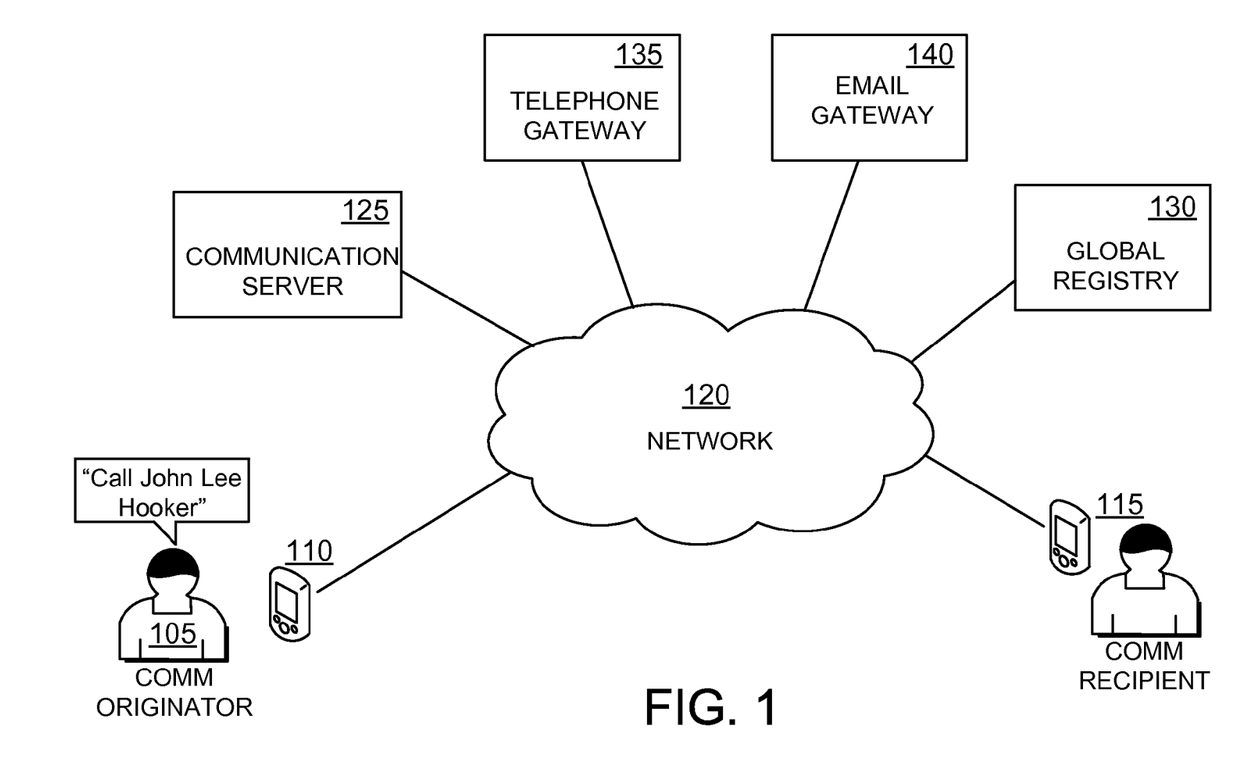
FIG. 1 is a block diagram of a communication network topology.

To help maintain and enforce such characteristics, a global registration entity (also referred to herein as a global registry) could oversee the registration and ongoing use of such communication identifiers. FIG. 1 is a block diagram of a network topology 100 that could be used for such a purpose. As shown, a communication originator 105 uses voice input to speak into a communication device 110 (e.g., smart phone or other mobile device) the desired phonetically unique communication identifier of the communication recipient 115 with whom communication originator 105 desires to communicate. The communication originator's utterance can be parsed at the mobile device 110 and/or transmitted via network 120 to a communication server 125 for parsing and analysis to identify the phonemes included in the communication originator's utterance. In any event, the identified phonemes are then transmitted to the global registry 130 and compared against the registered users to identify a match and subsequently to translate the phonetically unique communication identifier into an actual communication pathway that can be used as appropriate to initiate and route the communicate to the intended communication recipient 115.

As an example, if the communication originator 105 desires to call the intended communication recipient 115, who happens to have registered the phonetically unique communication identifier "John Lee Hooker" as his handle, then the communication originator 105 would initiate a telephone call to that recipient by speaking the utterance "Call John Lee Hooker" into his communication device 110. That utterance could be parsed either at the communication device 110 and/or at the communication server 125 to identify its constituent phonemes, which would then be transmitted via network 120 to the global registry 130, which in turn would attempt to match the received phonemes with the one of its registered users. Once found, because the utterance included the command "call" (as opposed, e.g., to "email"), the global registry 130 would extract the matched user's telephone number and return it, as appropriate, to the communication device 110 or the communication server 125, or both, which in turn would communicate with the telephone gateway 135, to place a call to the intended communication recipient 115. If, on the other hand, the communication originator 105 had uttered "email John Lee Hooker," then global registry 130 would extract John Lee Hooker's email address and return it, as appropriate, to the communication device 110 and/or to the communication server 125, which in turn would communicate with the email gateway 140 to initiate an email message to the intended communication recipient 115.

In a potential implementation, internet domain names and the domain name registrars, which are accredited by ICANN (Internet Corporation for Assigned Names and Numbers), could be used, respectively, as the above-described phonetically unique communication identifiers and the global registry. That is, a user could register the domain name johnleehooker.com (and/or .net, .org, etc.) with a domain name registrar and having done so, in addition to having that registration serve the usual internet domain name purposes, that registered domain name could also serve as a phonetically unique communication identifier that others could use to initiate communications with the person or entity associated with johnleehooker.com. To do so, a communication originator would, for example, speak the utterance "call john lee hooker dot corn" into his communication device. That utterance would be parsed and transmitted to an appropriate domain name registrar server, which in turn would match the specified phonetically unique communication identifier ("johnleehooker.com") with a corresponding registrant, retrieve that registrant's designated telephone number (because the utterance included the command "call") and then return the retrieved telephone number as appropriate to initiate a call from the communication originator's communication device to retrieved telephone number.

Corporations, organizations or other non-human entities could also register domain named-based communication paths in a similar manner. For example, imagine a national pizza restaurant chain named "PizzaWorld", which maintains an internet domain name registration for pizzaworld.com. The PizzaWorld corporation could enable users to call, email or otherwise communicate with PizzaWorld headquarters (or, for example, a consumer relations hotline) by designating "pizzaworld.com" as a phonetically unique communication identifier and specifying corresponding telephone numbers, email addresses, website addresses and/or other appropriate communication paths. Further, the PizzaWorld corporation could facilitate more localized communications (rather than just to a single main facility) by registering internet domain names corresponding to one or more specific localities, for example, pizzaworlddelmar.com, which would have its own localized contact information that could then be used by the public in that locality to initiate communications with the local PizzaWorld branch. To do so, a communication originator would simply utter "call pizza world del mar dot com" (or, optionally, the "dot com" portion of the utterance could be dropped and instead could be inferred) in his communication device and, based on the above-described process, the telephone number of the Del Mar branch of Pizza World would be retrieved from the registry records and used to initiate a telephone call.

To implement this additional communication functionality within the existing domain name registration framework, the domain name registrars would have, among other things, interfaces to entities such as the communication server 125, telephone gateway 135 and email gateway 140, and further would maintain corresponding communication paths (e.g., telephone numbers, email addresses, etc.) for each participating domain name registrant.

Figure 2:
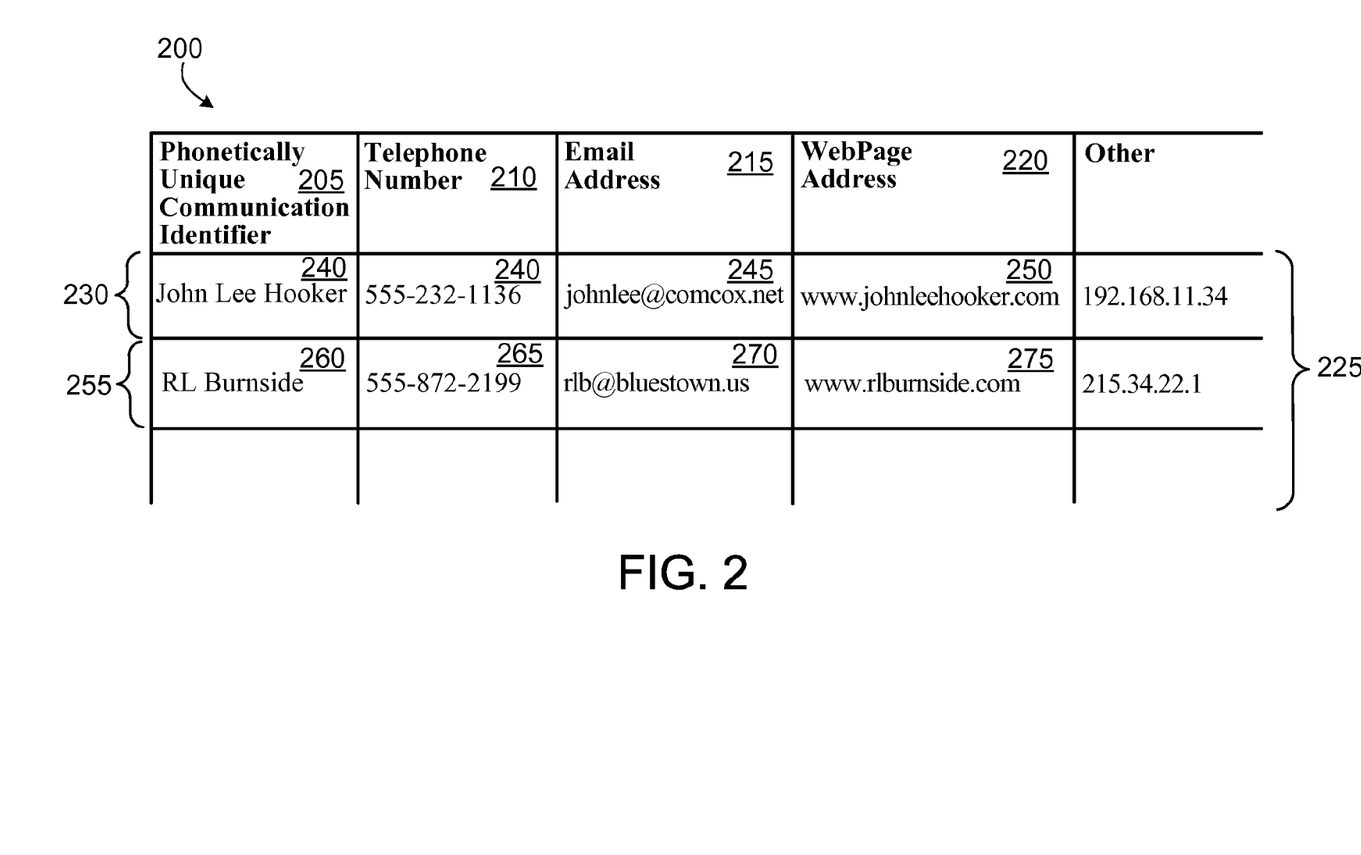
FIG. 2 is an example of a global repository table of phonetically unique communication identifiers.

FIG. 2 is an example of a portion of a global repository table 200 of communication identifiers such as could be maintained by the global registry 130. As shown therein, the table 200 includes a column 205 of phonetically unique communication identifiers, along with one or more columns of associated communication paths such as telephone number column 210, an email address column 215, a website column 220 and the like. Each of the rows 225 corresponds to a different registered user. For example, row 230 corresponds to a user having the phonetically unique communication identifier "John Lee Hooker" in table cell 235 and an associated telephone number, email address and website in table cells 240, 245 and 250, respectively, while row 255 corresponds to a user having the phonetically unique communication identifier "RL Burnside" in table cell 260 and an associated telephone number, email address and website in table cells 265, 270 and 275, respectively.

Figure 3:
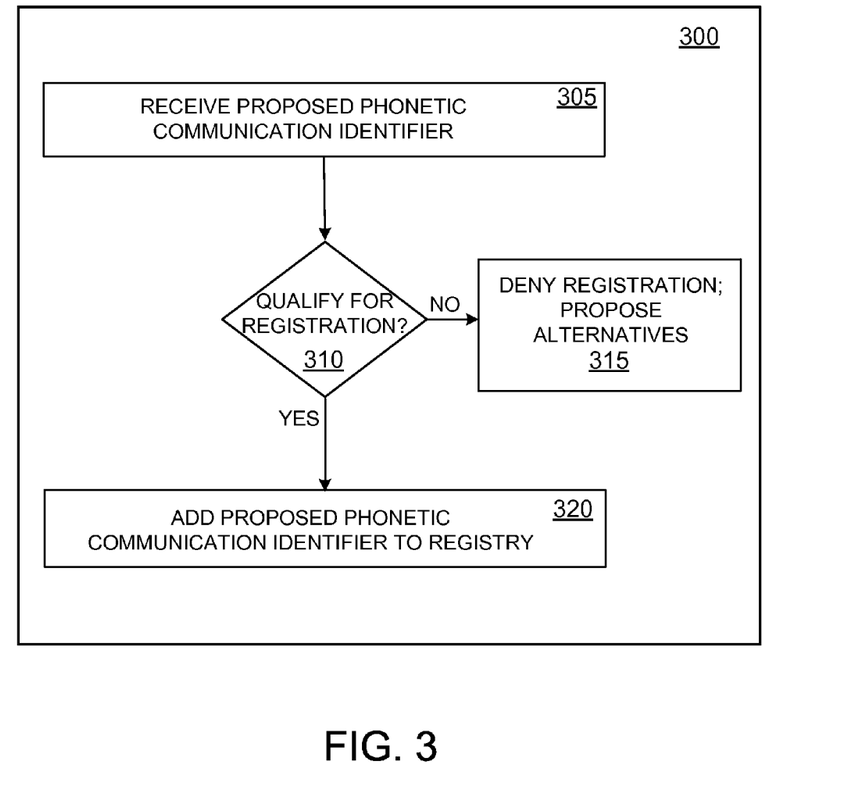
FIG. 3 is an example of a process for registering phonetically unique communication identifiers.

FIG. 3 is an example of a process 300 for enabling a user to register its own phonetically unique communication identifier, which can then be used by others to initiate an instance of communication with that user based on the techniques described herein. First, at 305, the process 300 receives, via a web interface or via voice input or other suitable user interface, a proposed phonetic communication identifier from a user seeking to register that identifier. Next, at 310, the process 300 determines if the received phonetic communication identifier qualifies for registration, for example, by determining whether the identifier is appropriately phonetically unique in a speaker-independent sense and taking into account differences in language, pronunciation, voice, accent and/or other factors that could impact phonetic uniqueness. Qualification for registration also typically depends on whether the proposed communication identifier already is taken by another user, or otherwise reserved or unavailable. If the proposed phonetic communication identifier is determined not to qualify for registration then, at 315, the process 300 denies registration and, optionally, proposes alternatives to the users of other communication identifiers that have determined both to be globally phonetically unique and available for registration. If, on the other hand, the proposed phonetic communication identifier is determined to qualify for registration then, at 320, the process 300 adds the proposed phonetic communication identifier to the registry and otherwise makes it available for use by others to initiate instances of communication with the registrant.

Figure 4:
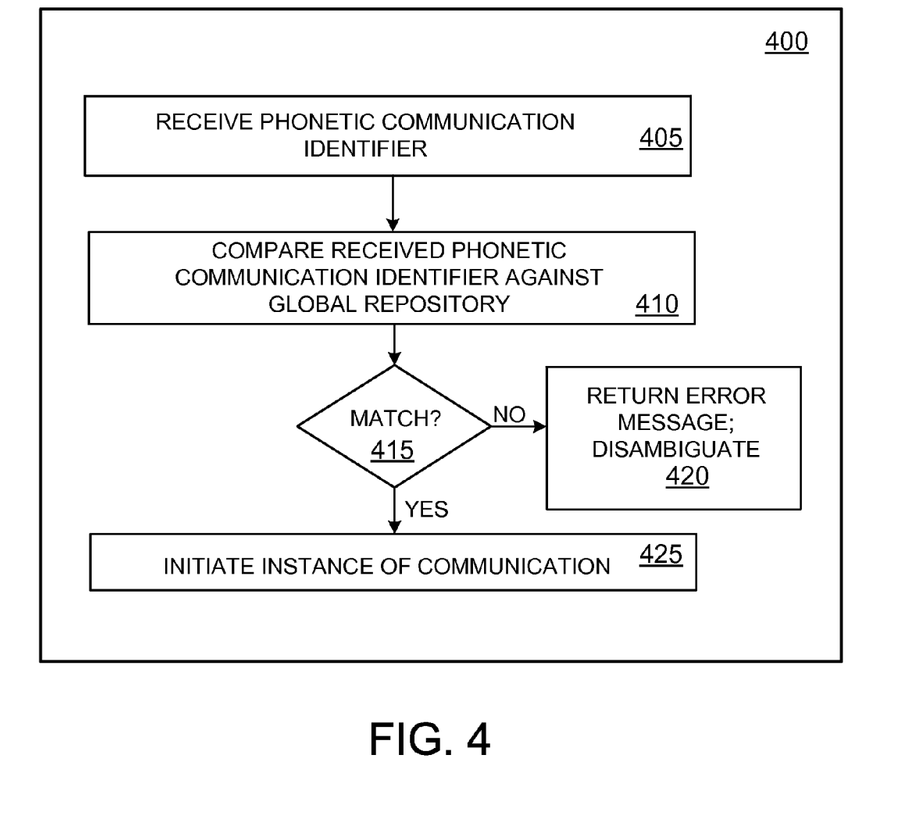
FIG. 4 is an example of a process for using phonetically unique communication identifiers to initiate an instance of communication.

FIG. 4 is an example of a process 400 for using a phonetically unique communication identifier (e.g., one that has already been registered using process 300 of FIG. 3) to initiate an instance of communication. First, at 405, the process 400 receives, via a web interface or via voice input or other suitable user interface, information describing a phonetic communication identifier that, for example, was uttered by a communication originator seeking to initiate an instance of communication. Next, at 410, the process 400 compares the received phonetic communication identifier against the universe of registered phonetically unique communication identifiers. At 415, the process 400 determines based on a result of the comparison whether the received phonetic communication identifier matches one of the registry entries. If not then, at 420, the process 400 can return an error message along the lines of "Communication Cannot Be Completed" or "Communication Recipient Cannot Be Identified." Alternatively, if at 415 the process 400 has identified two or more potential matches, then the process optionally can query the communication originator for additional information in an effort to disambiguate among the multiple matches. Once a match is determined then, at 425, the process 400 returns the appropriate communication path (e.g., telephone number or email address) associated with the matched registrant, which information is used subsequently to initiate an instance of communication.

Figure 5:
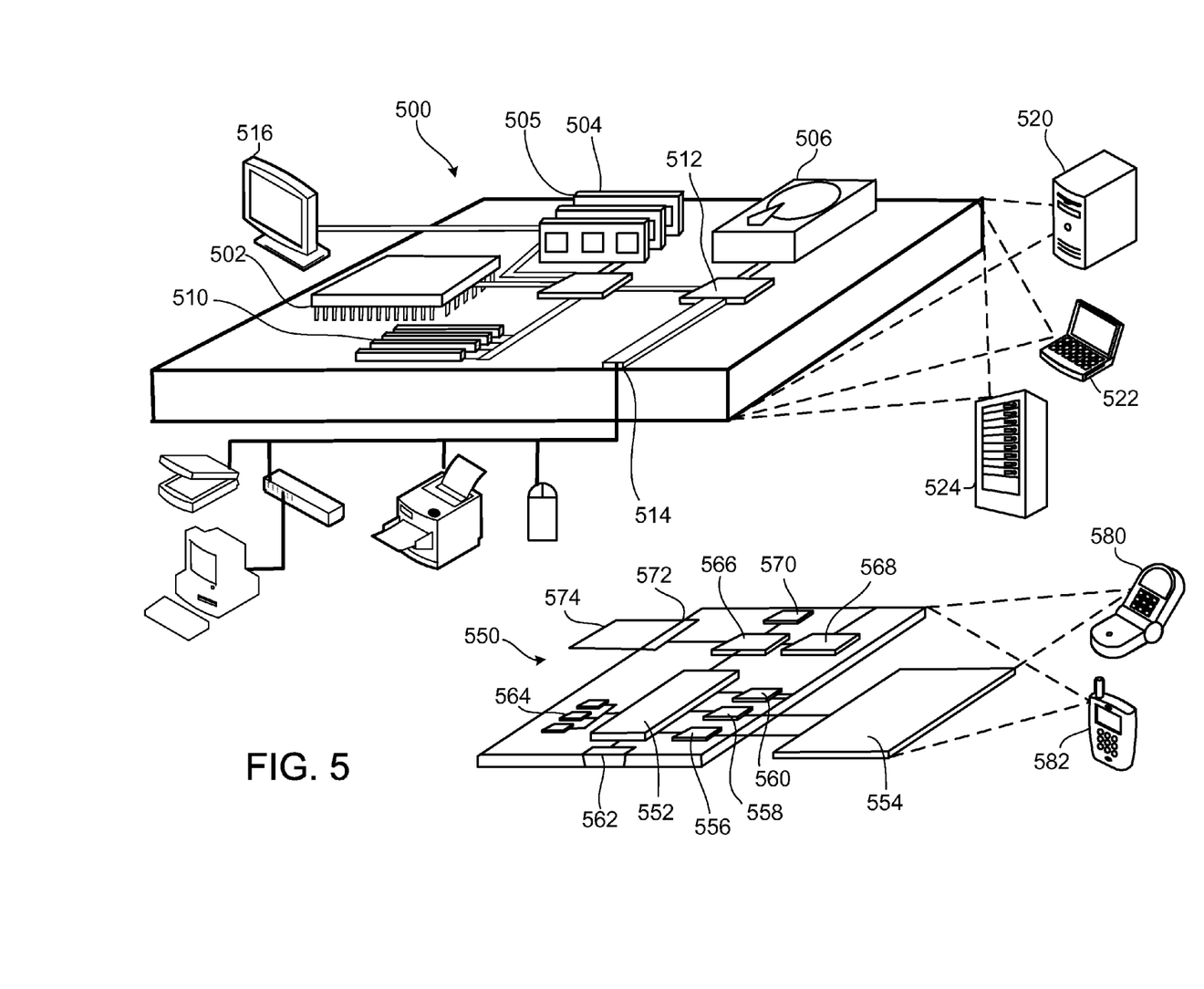
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for detecting impersonation on a social network may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method performed by data processing apparatus, the method comprising:
   receiving information from a user including a phonetic communication identifier that other users can speak into their respective communication devices to initiate communication with a communication device associated with the user;
   comparing, by the data processing apparatus, the received phonetic communication identifier with a repository of phonetically unique communication identifiers each registered to an associated entity;
   registering the received phonetic communication identifier in the repository if, based on a result of the comparison, the received phonetic communication identifier is determined to be phonetically unique relative to all other phonetically unique communication identifiers in the repository; and
   making the repository available to initiate communications with registered entities.

2. The method of claim 1 wherein the determination of phonetic uniqueness takes into account one or more of differences in speakers' race, ethnicity, accent, language, dialect, pronunciation, gender, age, and region.

3. The method of claim 1 further comprising prompting the user to enter a different phonetic communication identifier if, based on a result of the comparison, the received phonetic communication identifier is determined not to be phonetically unique relative to one or more of the phonetically unique communication identifiers in the repository.

4. The method of claim 3 further comprising providing the user with suggestions for a phonetically unique communication identifier if, based on a result of the comparison, the received phonetic communication identifier is determined not to be phonetically unique relative to one or more of the phonetically unique communication identifiers in the repository.

5. The method of claim 1 wherein the information received from the user further comprises one or more of a telephone number, an email address, and a website address associated with the first user.

6. The method of claim 1 wherein the determination of phonetic uniqueness is speaker-independent.

7. The method of claim 1 wherein the repository is globally available and each registered communication identifier is globally phonetically unique.

8. The method of claim 1 wherein at least two or more of the phonetically unique communication identifiers in the repository are registered internet domain names.

9. The method of claim 1 wherein the repository of phonetically unique communication identifiers is administered by one or more internet domain name registrars.

10. A system comprising:
    a processor configured to execute computer program instructions; and
    a computer storage medium encoded with computer program instructions that, when executed by the processor, cause the system to perform operations comprising:
    receiving from a user information including a phonetic communication identifier that other users can speak into their respective communication devices to initiate communication with a communication device associated with the user;
    comparing the received phonetic communication identifier with a repository of phonetically unique communication identifiers each registered to an associated entity;

registering the received phonetic communication identifier in the repository if, based on a result of the comparison, the received phonetic communication identifier is determined to be phonetically unique relative to all other phonetically unique communication identifiers in the repository; and making the repository available to initiate communications with registered entities.

11. The system of claim 10 wherein the determination of phonetic uniqueness takes into account one or more of differences in speakers' race, ethnicity, accent, language, dialect, pronunciation, gender, age, and region.

12. The system of claim 10 further comprising prompting the user to enter a different phonetic communication identifier if, based on a result of the comparison, the received phonetic communication identifier is determined not to be phonetically unique relative to one or more of the phonetically unique communication identifiers in the repository.

13. The system of claim 12 further comprising providing the user with suggestions for a phonetically unique communication identifier if, based on a result of the comparison, the received phonetic communication identifier is determined not to be phonetically unique relative to one or more of the phonetically unique communication identifiers in the repository.

14. The system of claim 10 wherein the information received from the user further comprises one or more of a telephone number, an email address, and a website address associated with the user.

15. The system of claim 10 wherein the determination of phonetic uniqueness is speaker-independent.

16. The system of claim 10 wherein the repository is globally available and each registered communication identifier is globally phonetically unique.

17. The system of claim 10 wherein at least some of the phonetically unique communication identifiers in the repository are registered internet domain names.

18. The system of claim 10 wherein the repository of phonetically unique communication identifiers is administered by one or more internet domain name registrars.

19. A non-transitory computer storage medium encoded with a computer program that comprises instructions that when executed by data processing apparatus cause the data processing apparatus to perform operations comprising:

receiving information from a user including a phonetic communication identifier that other users can speak into their respective communication devices to initiate communication with a communication device associated with the user;

comparing the received phonetic communication identifier with a repository of phonetically unique communication identifiers each registered to an associated entity;

registering the received phonetic communication identifier in the repository if, based on a result of the comparison, the received phonetic communication identifier is determined to be phonetically unique relative to all other phonetically unique communication identifiers in the repository; and making the repository available to initiate communications with registered entities.

20. The non-transitory medium of claim 19 wherein the determination of phonetic uniqueness takes into account one or more of differences in speakers' race, ethnicity, accent, language, dialect, pronunciation, gender, age, and region.

21. The non-transitory medium of claim 19 further comprising prompting the user to enter a different phonetic communication identifier if, based on a result of the comparison, the received phonetic communication identifier is determined not to be phonetically unique relative to one or more of the phonetically unique communication identifiers in the repository.

22. The non-transitory medium of claim 21 further comprising providing the user with suggestions for a phonetically unique communication identifier if, based on a result of the comparison, the received phonetic communication identifier is determined not to be phonetically unique relative to one or more of the phonetically unique communication identifiers in the repository.

23. The non-transitory medium of claim 19 wherein the information received from the user further comprises one or more of a telephone number, an email address, and a website address associated with the user.

24. The non-transitory medium of claim 19 wherein the determination of phonetic uniqueness is speaker-independent.

25. The non-transitory medium of claim 19 wherein the repository is globally available and each registered communication identifier is globally phonetically unique.

26. The non-transitory medium of claim 19 wherein at least some of the phonetically unique communication identifiers in the repository are registered internet domain names.

27. The non-transitory medium of claim 19 wherein the repository of phonetically unique communication identifiers is administered by one or more internet domain name registrars.

* * * * *

UNITED STATES PATENT AND TRADEMARK OFFICE
CERTIFICATE OF CORRECTION

| | |
|---|---|
| PATENT NO. | : 8,520,807 B1 |
| APPLICATION NO. | : 13/572369 |
| DATED | : August 27, 2013 |
| INVENTOR(S) | : Philip Hewinson |

Page 1 of 1

It is certified that error appears in the above-identified patent and that said Letters Patent is hereby corrected as shown below:

In the Claims

Column 10, line 42, Claim 5, please delete "first user" and insert therefor -- user --

Signed and Sealed this
Fifth Day of November, 2013

Teresa Stanek Rea
*Deputy Director of the United States Patent and Trademark Office*